United States Patent [19]

Konietzki

[11] Patent Number: 4,788,787
[45] Date of Patent: Dec. 6, 1988

[54] SCENT PROPAGATION DEVICE

[76] Inventor: Melvin Konietzki, P.O. Box 13, Nekoosa, Wis. 54457

[21] Appl. No.: 100,933

[22] Filed: Sep. 25, 1987

[51] Int. Cl.$^4$ ............................................. A01M 31/06
[52] U.S. Cl. ............................................. 43/1; 239/48; 239/52; 242/55.55
[58] Field of Search .................... 43/1, 2, 131, 124; 239/44, 48, 50, 52, 34, 42, 43, 57; 242/55.55

[56] References Cited

U.S. PATENT DOCUMENTS

| | | | |
|---|---|---|---|
| 2,613,989 | 10/1952 | Smith | 239/44 |
| 2,959,354 | 11/1960 | Beck . | |
| 3,046,192 | 7/1962 | Bilyeu | 43/124 |
| 3,119,650 | 1/1964 | Bilyeu . | |
| 3,123,303 | 3/1964 | Dearling | 239/57 |
| 3,211,345 | 10/1965 | Geiger | 239/44 |
| 4,272,036 | 6/1981 | Watermann . | |
| 4,523,717 | 6/1985 | Schwab | 43/131 |
| 4,667,430 | 5/1987 | Ziese | 43/1 |
| 4,682,715 | 7/1987 | Reeves | 43/1 |

Primary Examiner—Gene P. Crosby
Attorney, Agent, or Firm—Lathrop & Clark

[57] ABSTRACT

A scent propagation device (10) for luring animals and then masking the scent of a human who is hunting game has a line (21) of substantial length that is wound on a free-moving spool (20). The spool (20) is rotatably mounted within a leak-proof container that is comprised of an upper housing (11) that sealingly mates with a lower housing (12). A plug (40) in the body of the container may be removed to open a channel to the interior of the scent propagation device (10) so that a liquid concentrate of a desired scent may be added. The line (21) is absorbent and becomes saturated with the scent. To disperse the desired scent, the user withdraws the line (21) from the container by tying the line (21) to a fixed object and walking away from that object. The line (21) is guided to exit the container through a bushing (26) that also partially meters the scent concentrate and extracts excess liquid concentrate. The line may be manually rewound onto the spool (20) by a spool driver (30) that is rotated by a crank (31) turned by the user. A valve (50) may be closed against the line (21) to tension the line (21) to either lock the line (21) in position, to create a tighter wrap around the spool (20) when the line (21) is being rewound, or to meter the amount of liquid scent concentrate that is dispensed. The scent masking device can be disassembled for cleaning purposes, or to change a spool (20).

17 Claims, 2 Drawing Sheets

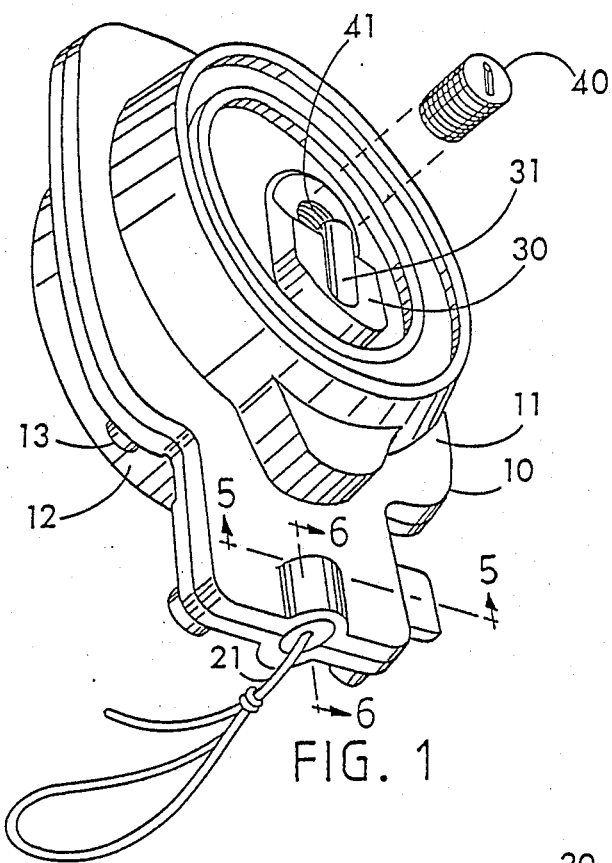
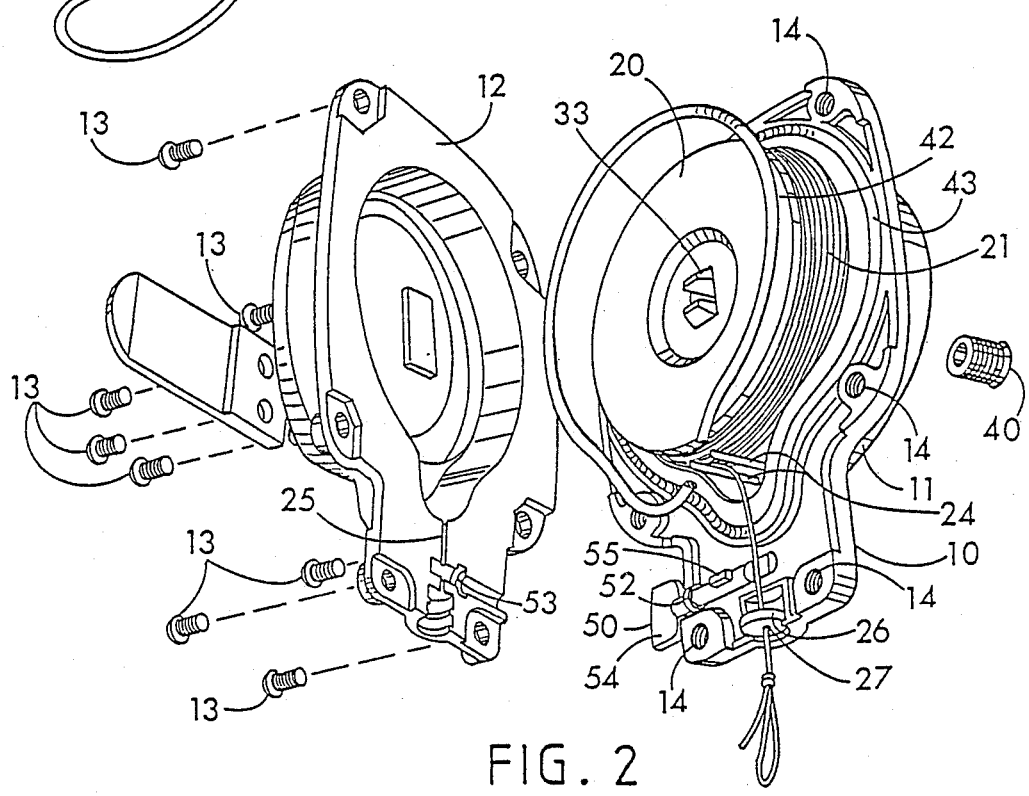

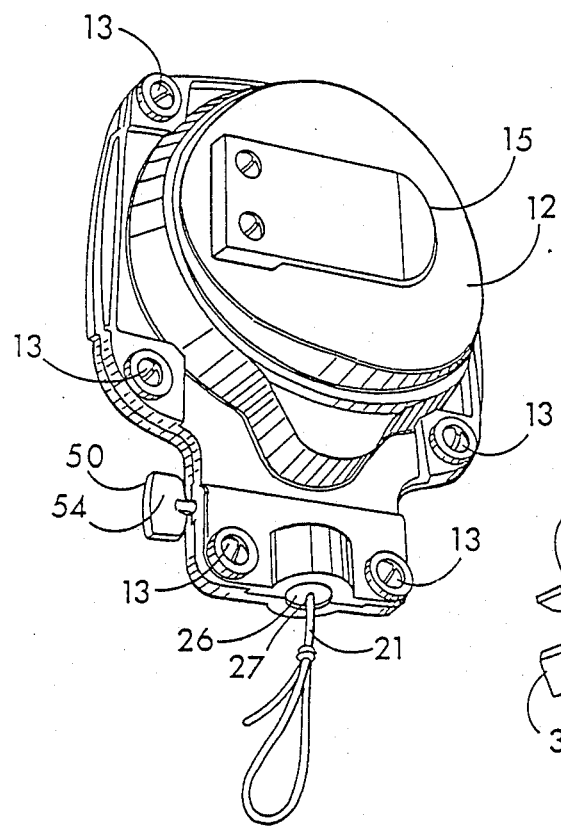
FIG. 3
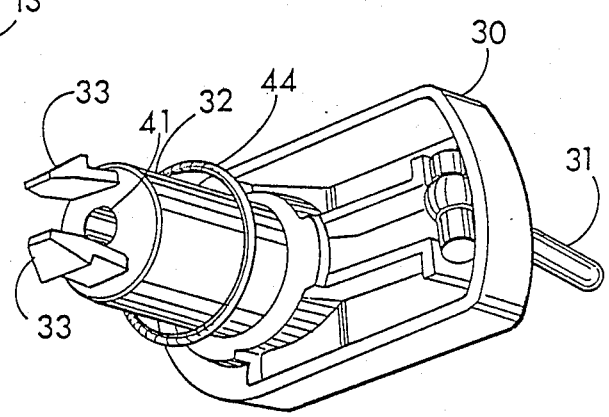
FIG. 4
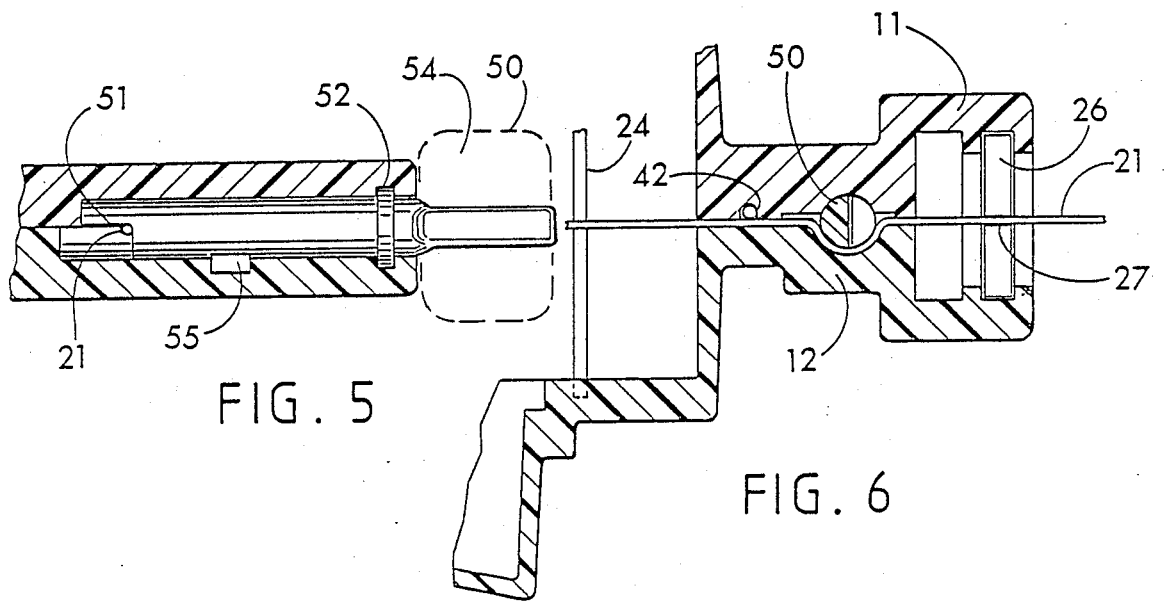
FIG. 5
FIG. 6

SCENT PROPAGATION DEVICE

FIELD OF THE INVENTION

This invention relates to a device for the propagation of a scent to lure deer or other wild game that are being hunted, and which masks the scent of the human that is hunting so that the game is not alerted to the presence of the human.

BACKGROUND ART

Liquid concentrates of various scents are often employed to either lure deer and other hunted game, or to camouflage the scent of the hunter. In luring these animals, it is common for hunters to use scents of the hunted animals, such as urines, estrus scents, and the metatarsus of the animals, particularly at the rut time. The olfactory organs of these game are also sensitive to the scent of humans. Hunters often attempt to disguise their scent to avoid detection by these wild animals. The scents that are used to mask the human scents are typically those scents indigenous to the natural environment of the game. Examples of these scents include pheromones or musk of the hunted animal, pine, cedar, white oak, acorn, apple, or urine from other co-inhabitors of the area.

The scent may be dispensed in a number of ways. The liquid concentrate of the scent may be applied to the clothing or shoes of the hunter, it may be sprinkled in the hunting area, or it may be carried in an open or porous cannister. The application of liquid scent concentrate to the clothing or shoes of the hunter is disadvantageous because the odor is strong and may be somewhat unpleasant. The odor permeates the hunter's clothing and the clothing may retain the unpleasant odor long after the hunting season is over.

The sprinkling of the liquid scent in the hunting area may be an inefficient and wasteful dispersal method. The liquid scent is relatively expensive, and it may be easy to dispense more than necessary.

The carrying of the liquid scent in an open or porous container may be unwieldy to hunters that must carry their guns and other necessary gear. Since heat aids in the diffusion of the masking or luring scent, the scent must often be heated to at least body temperature to obtain an effective dispersion of the scent. The hunter must therefore be concerned with maintaining the necessary fuel or energy source to heat the scent.

SUMMARY OF THE INVENTION

In accordance with the present invention, a scent propagation device has a leak-proof container and a line contained in the housing that is saturated with liquid concentrate of a scent indigenous to the environment of the game that is hunted. The line may be drawn out from within the housing as a means of dispersing the scent. To use the scent propagation device, the hunter lays out the line, taking into account the area and its air currents. The scent propagation device can lure a hunted animal while the hunter is stationed at a stand, or it can be used when the hunter is tracking the game. By anticipating the animal's reaction to a particular scent, the movements of the game may be controlled.

A removable plug is screwed into the outside of the container of the scent propagation device. When the plug is removed, a channel is opened to the interior of the device. Liquid scent concentrate may be added through this channel to saturate the line with the desired scent. When the plug is screwed back into place, the scent propagation device is leak-proof. Separable housing sections are sealed with gaskets that fit into grooves at the point of separation. A gasket also seals the spool driver at the point of contact with the housing.

The line is composed of a material that is capable of absorbing the liquid scent concentrate. The line is wound around a free-moving spool that is mounted on the interior of the housing. Coming off the spool, the line is routed over the gasket to a bushing. The line passes through an inner diameter of the bushing to the exterior of the housing. The line typically may be unwound by tying the line to a fixed object, such as a tree trunk, bush, or rock, and the user then walks away from that object. The line is then unwound from the free-moving spool. The device has a belt clip so that the device may be attached to a belt or other article of clothing, freeing the user's hands for other tasks.

The scent propagation device features a means of tensioning the line. In its preferred embodiment, the line is tensioned by a valve that opens and closes against the line. The valve serves as a means of locking the line in place to prevent further unwinding of the line. Upon unwinding of the line, an adjustment of the valve may also be made by the user for purposes of metering the amount of liquid scent concentrate that is dispensed. A spool driver is used to retract unwound line back onto the spool. To ensure compact line storage on the spool, the valve may be turned to tension the line while the line is being rewound, thereby creating a tighter wrap of the line around the spool.

The bushing through which the line passes to the exterior of the housing acts as an additional means of metering the amount of scent concentrate that is used by the hunter. The inner diameter of the bushing is smaller than the thickness of the line in a relaxed state, acting to compress the line and extract excess liquid while the line is being unwound by the user.

By use of a line, valve, and bushing to meter the amount of liquid that is used, the scent propagation device is an efficient means of dispersing the luring scent. The device is compact in size, and by use of the belt clip, keeps the hands of he hunter free for other tasks. The scent-dispersing capabilities of the line are superior or comparable to systems that heat the scent.

Further objects, features, and advantages of the invention will be apparent from the following detailed description when taken in conjunction with the accompanying drawings.

BRIEF DESCRIPTION OF THE DRAWINGS

FIG. 1 is a top perspective view of the scent propagation device in accordance with the invention with the sealing plug shown removed from its socket.

FIG. 2 is an exploded perspective view of the scent propagation device, showing the disassembled parts in relationship to one another.

FIG. 3 is a bottom perspective of the scent propagation device.

FIG. 4 is a perspective view of the spool driver.

FIG. 5 is a cross-section along line 5—5 of FIG. 1 showing the line lock in the unlocked position.

FIG. 6 is a cross-section along line 6—6 of FIG. 1, except that the line lock is shown in the locked position.

DESCRIPTION OF THE PREFERRED EMBODIMENT

With reference to the drawings, a preferred embodiment of a scent propagation device constructed in accordance with the invention is shown generally at 10 in FIGS. 1, 2, and 3. The scent propagation device 10 has an upper housing 11 that mates with a lower housing 12, the upper housing 11 and the lower housing 12 being connected to each other by screws 13. The screws 13 are preferably composed of mild steel plated with black oxide. The screws 13 are inserted through the lower housing 12 and threaded into sockets 14 that are embedded in the upper housing 11. The sockets 14 are preferably brass helicoil TM threaded inserts.

The upper housing 11 and the lower housing 12 are an encasement for a spool 20 that is wound with a line 21. The line is preferably formed of a strong, liquid permeable material, such as 30# test line, formed of uncoated braided nylon or other fibers which will hold liquid, and preferably of substantial length, e.g., 100 yards. One end of the line 21 is secured to the inner circumference of the spool 20. At the other end of the line 21, the line 21 may be unwound from the spool 20. The line 21 is routed off the spool 20 between two roller pins 24, preferably composed of stainless steel, that guide the line 21 into a groove 25 in the lower housing 12. The line 21 then passes over a valve 50 that enables the user to lock the line 21 in place, preventing the spool 20 from unwinding. The operation of the valve 50 is explained further below. The line then exits the interior of the scent propagation device 10 through an inner diameter 27 of a bushing 26. The user may attach the end of the line 21 to a fixed object, such as a tree branch, and may then unwind the spool 20 by walking away from the fixed object. The scent propagation device features a belt clip 15 so that the device may be clipped to a belt or other article of clothing, freeing the user's hands to carry other hunting equipment or to perform other tasks. By not having to handle the device, the user avoids the possibility of accidentally introducing a human scent to the line.

When the user desires to wind up the line 21 onto the spool 20 from an unwound or partially unwound position, the user manually turns a spool driver 30. When retracting the line 21, the line 21 may be tensioned by adjustment of the valve 50 to ensure compact line storage on the spool 20. The user grasps a crank 31 attached to the spool driver 30, and the spool driver 30 is rotated along the top of the upper housing 11. FIG. 1 shows the crank 31 in a collapsed position; the crank 31 may be pivoted to an upright position so that the user may turn the spool driver 30 with ease. The crank 31 may be placed in the collapsed position to conserve space when being stored, or to prevent the crank 31 from catching on such things as branches or bushes as the user walks by.

As shown in FIG. 4, the spool driver 30 has an axle 32 that is inserted into a rectangular-shaped hub 33 of the spool 20. At the end of the axle 32 are two barbs 33 that snap into position at the opening of the hub 32, and secure the axle 32 of the spool driver 30 to the hub 32 of the spool 20. The spool 20 is therefore rotated when the crank 31 is manually turned by the user. The axle 32 is lightly lubricated to ensure free movement within the upper housing 11.

The axle 32 is hollow and has a removable plug 40 on the end opposite the barbs 33 in the body of the spool driver 30. The plug 40 may be unscrewed and a channel 41 is opened between the exterior and interior of the scent propagation device 10. The user may then pour in the desired liquid scent concentrate through the channel 41 and re-insert the plug 40. The interior of the scent propagation device 10 preferably has a capacity of approximately one fluid ounce. The line 21 is then saturated to leave the desired scent upon withdrawing the now scent-laden line 21 from the interior of the scent propagation device 10 and laying the line out according to the area and the air currents. When the scent-laden line 21 is withdrawn from the interior of the scent propagating device 10, the amount of liquid scent concentrate that is used is metered by adjustment of the valve 50, and to a lesser extent, the traversing of the line 21 through the bushing 26. The dimension of the inner diameter 27 of the bushing 26 is less than the relaxed diameter of the line 21, the line being 0.019 inches in diameter. The bushing 26 therefore compresses the line 21 upon the line 21 being withdrawn through the inner diameter 27, and excess liquid is extracted from the line 21.

The scent propagation device 10 is preferably constructed of high density polyethylene that resists caustic chemicals and odors associated with scents. A gasket 42 is positioned in a groove 43 of the upper housing 11 to prevent leakage of the scent concentrate from between the mating surfaces of the upper housing 11 and the lower housing 12. The gasket 42 also prevents contamination or dilution of the scent from unwanted liquids that might enter from the exterior of the scent propagation device 10. There is also a second gasket 44 where the spool driver 30 contacts the upper housing 11 to further seal the scent propagation device 10. The gaskets are preferably composed of 70 durometer buna rubber. To provide an optional seal, the gaskets 42 and 44 are preferably continuous O-rings. The line 21 passes over the gasket 42 to the exterior of the scent propagation device 10 by means of the groove 25, thus maintaining the integrity of the seal. The line 21 is aligned for proper passage across the gasket 42 and into the groove 25 by means of the roller pins 24. The roller pins 24 are also used to pre-wipe the line 21 before it crosses into the area of the gasket 42. As noted earlier, the valve 50 and bushing 26 also will wipe the line 21 and act to meter the amount of liquid scent concentrate that is dispensed. The incorporation of the roller pins 24 over which the line passes prevents over-saturation of the liquid scent concentrate in the valve 50 and brushing 26 areas--areas that could leak if overloaded.

The scent propagation device 10 may be disassembled by the user so that the various parts may be cleaned. The upper housing 11 may be separated from the lower housing 12 by removal of the screws 13 from the sockets 14. The valve 50 and the bushing 26 may be removed from their respective grooves upon the separation of the upper housing 11 from the lower housing 12. The spool 20 may be separated from the spool driver 30 by pinching the barbs 33 together. After cleaning the parts, the parts may be reassembled in the reverse manner. It is preferable for the user to wash his hands or wear plastic gloves when reassembling so as to prevent introducing a human scent onto the components of the scent propagation device 10. In addition to the disassembly of the scent propagation device 10 for cleaning purposes, the scent propagation device 10 may also be taken apart to change the spool 20. This may be done, for example, if the line 21 is severed, or if a new scent is desired to be used.

FIGS. 4 and 5 show a more detailed depiction of the functioning of the valve 50. FIG. 5 shows the valve 50 in an open position, allowing the line 21 to pass uninhibited through a notch 51 in the valve 50. A collar 52 fits into a groove 53 and prevents the valve 50 from sliding out of position. A handle 54 allows the user to close the valve 50 by turning the handle 54 one-quarter turn either clockwise or counter-clockwise. A key 55 abuts against the upper housing 11 when turned one-quarter turn either way and prevents further movement. FIG. 6 shows the valve 50 from another angle, but the valve 50 here is instead in the closed position. In the closed position, the valve 50 is turned one-quarter turn from the open position, and impedes the free movement of the line 21. As noted earlier, the adjustment of the valve 50 may be made to tension the line 21 upon retraction to provide compact line storage on the spool 20, to lock the line 21 in place as desired by the user, or to meter the amount of liquid scent concentrate that is dispensed. The valve 50 also keeps the liquid scent concentrate from wicking back out from the line 21.

It is understood that the invention is not confined to the particular construction and arrangement of parts herein illustrated and described, but embraces such modified forms thereof as come within the scope of the following claims.

What is claimed is:

1. A device for propagating a scent which comprises:
   (a) a line capable of being saturated with a liquid concentrate of a scent that lures animals; and
   (b) a sealed container in which the line is stored and means from which the line may be reeled out or returned when desired, and liquid scent concentrate in the container for saturating said line.

2. The device of claim 1 further comprising a removable plug that may be opened to the interior of the sealed container by which liquid concentrate may be added.

3. The device of claim 1 further comprising:
   (a) a spool around which the line may be wound or unwound; and
   (b) a spool driver that is capable of reeling in unwound line onto the spool.

4. The device of claim 3 further comprising means for tensioning the line to hold the line in place and to provide a tight wrap around the spool.

5. The device of claim 1 further comprising a means for metering the amount of liquid scent concentrate that is dispensed.

6. The device of claim 5 wherein the means for metering comprises an opening through which the line passes from the interior of the sealed container to the exterior of the sealed container that is of a diameter less than the relaxed diameter of the line.

7. The device of claim 1 wherein the sealed container has a top housing and bottom housing which are adapted to be disassembled to allow the cleaning and maintenance of all the parts that comprise the scent propagation device.

8. The device of claim 7 further including a gasket at the point of separation between the top housing and bottom housing.

9. The device of claim 8 wherein the line passes over the gasket to exit the interior of the device.

10. The device of claim 3 including a gasket at the point of contact between the container and the spool driver.

11. The device of claim 3 further comprising a means for selectively engaging the spool to the spool driver so that the spool may be removed and replaced with another spool.

12. The device of claim 1, the sealed container being composed of high density polyethylene.

13. The device of claim 1 wherein the line is composed of uncoated braided nylon.

14. A device for propagating a scent which comprises:
   (a) a line capable of being saturated with a liquid concentrated of a scent that lures animals;
   (b) a sealed container in which the line is stored and from which the line may be played out when desired, and that also holds the liquid scent concentrate;
   (c) a spool around which the line may be wound or unwound;
   (d) a spool driver that is capable of reeling in unwound line onto the spool;
   (e) means for tensioning the line to hold the line in place and to provide a tight wrap around the spool, the means for tensioning the line including a valve which comprises:
      (i) a notched stem in which the notch faces the line in one position to allow free-movement of the spool, and the notch faces away from the line in the other position to tension the line during winding of the line upon the spool for compact storage and to lock the line in place as desired by the user, the stem being set in a groove perpendicular to the path of the line after the line leaves the spool;
      (ii) a handle that joins the stem to allow the user to manually select either of the two valve positions;
      (iii) a collar that prevents the valve stem from sliding out of position; and
      (iv) a key extending from the stem that limits the turning of the stem between the two extreme positions by restricting the turning of the handle and attached stem when the key reaches a point where it abuts the housing.

15. A device for propagating a scent which comprises:
   (a) a line capable of being saturated with a liquid concentrate of a scent that lures animals;
   (b) a sealed container in which the line is stored and form which the line may be played out when desired, and that also holds the liquid scent concentrate;
   (c) means for metering the amount of liquid scent concentrate that is dispensed, wherein the means for metering comprises a valve that may be adjusted by the user to press against the line in various degrees, thereby affecting the degrees of saturation of the line being withdrawn from the device with liquid scent concentrate.

16. A device for propagating a scent, which comprises:
   (a) a line capable of being saturated with a liquid concentrate of a scent that lures animals;
   (b) a sealed container in which the line is stored and from which the line may be played out when desired, and that also holds the liquid scent concentrate;

(c) means metering the amount of liquid scent concentrate that is dispensed, wherein the means for metering comprises a pair of roller pins that wipe the line being withdrawn from the device, thereby affecting the degree of saturation of the line with liquid scent concentrate.

17. A method for masking the scent of humans which uses a line capable of being saturated with a liquid concentrate of a scent that masks human scent, which comprises the steps of:
 (a) storing the line in a sealed container soaked with a desired liquid scent concentrate;
 (b) withdrawing the line from the sealed container and laying it on the ground to allow dispersal of the scent; and
 (c) retracting the line into the sealed container after dispersal of the scent.

* * * * *